2,942,023
BIS-(p-HALOPHENYL)ESTERS OF CYCLIC 1,2-DICARBOXYLIC ACIDS

David A. Gordon and John M. Corbett, Midland, Mich., assignors to The Dow Chemical Company, Midland, Mich., a corporation of Delaware No Drawing. Filed Aug. 7, 1958, Ser. No. 753,605

3 Claims. (Cl. 260—468)

The present invention relates to bis(p-halophenyl) esters of cyclic 1,2-dicarboxylic acids and is particularly directed to compounds corresponding to the farmula

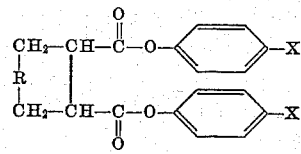

In this and secceeding formulas, R represents an ethylene or vinylene radical and X represents a halogen having an atomic weight between 30 and 85. These compounds are crystalline solids somewhat soluble in many common organic solvents such as tetrachloroethylene and carbon tetrachloride and of very limited solubility in water. The compounds are valuable as parasiticides and are adapted to be employed as active toxic constituents of compositions for the control of many fungal, bacterial and insect pests, such as cockroaches and houseflies. The compounds are also useful as herbicides and are adapted to be employed for the killing of submerged aquatic vegetation.

The new compounds may be prepared by a two step process which comprises the first step of heating p-chlorophenol or p-bromophenol with a dicarboxylic acid anhydride reactant corresponding to the formula

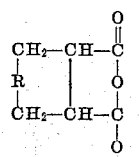

to form an intermediate compound corresponding to the formula

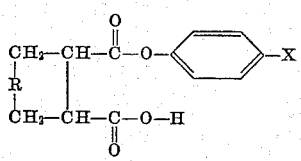

Such intermediate may be separately prepared and isolated for subsequent use, or it may preferably be prepared and employed in situ. In either procedure, the said intermediate is employed in a second step of the present process, wherein it is reacted with further p-halophenol in the presence of catalytic agent which may be phosphorus trichloride, phosgene, sulfuryl chloride, or preferably phosphorus oxychloride (POCl₃) to obtain the desired compound of the present invention.

In carrying out the first step of the process, the halophenol and the anhydride reactant are intimately mixed and blended together and the resulting reaction mixture heated for a period of time in the contacting temperature range of from about 60° to about 120° C. Good results are obtained when employing the first step reactants in equimolecular proportions.

In carrying out the second step of the process further halophenol, preferably in an amount equimolecular with anhydride starting reactant, is mixed and blended intimately together with, for example, about one third mole of phosphorus oxychloride for each mole of starting anhydride reactant, and with the heated mixture resulting from the first step. Heating in the contacting temperature range, and stirring, are continued, to complete the process and obtain the desired product.

In a preferred mode of procedure, 2 molecular proportions of p-halophenol and 1 molecular proportion of anhydride reactant are mixed and blended together and heated at 75°–105° C. for a period of time. Phosphorus oxychloride in about ⅓ to ½ molecular proportion is then added slowly, portionwise, and with continued stirring as heating is continued in the contacting temperature range, to complete the process and obtain the desired product.

In an alternative preparation, an acid corresponding to the formula

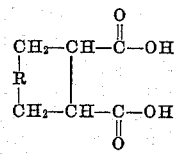

may be reacted with a p-halophenol reactant and catalyst, for example phosphorus oxychloride, in the stated procedures to obtain the desired product of the present invention. Good results are obtained when employing one molecular proportion of such acid and about two molecular proportions of p-halophenol together with about ⅔ to 1 molecular proportion of phosphorus oxychloride.

Upn completion of the preparation of the novel compound in any of the foregoing procedures, the reaction mixture is washed with water. Cold water or ice is preferred for at least the first washing, to limit the heat of hydrolysis of any unreacted phosphorus oxychloride. Thereafter, the product is purified in such ways as recrystallization from solvent, and the like.

The following examples illustrate the present invention but are not to be considered as limiting it.

*Example 1.—Bis(p-chlorophenyl) 1,2-cyclohexane dicarboxylate* p-Chlorophenol (271 grams; 2.1 moles) was intimately mixed and blended with 154 grams (1 mole) of 1,2-cyclohexane dicarboxylic acid anhydride. The resulting mixture was heated at a temperature of 100° C. for 2 hours. Thereafter 92 grams (0.6 mole) of phosphorus oxychloride was added slowly dropwise and with stirring at a contacting temperature of 80° C. Upon completion of the addition of the phosphorus oxychloride, the resulting reaction mixture was heated at 100° C. for 4 hours to carry the process to completion. The reaction mixture was then poured into a bed of finely crushed ice, whereby the mixture was promptly chilled and diluted with water resulting from melting of the ice. The ice mixture was thoroughly shaken, allowed to settle, whereupon it divided into separate layers, the water layer removed by decantation, and the remaining liquid organic residue washed repeatedly with water. The resulting oily liquid product residue was dissolved in ethanol and set aside for about 150 hours, during which time a crystalline product separated and settled in the ethanol solution, wherefrom it was removed by filtration and recrystallized from perchloroethylene. As a result of these operations, there was obtained a white solid crystalline bis(p-chlorophenyl)

1,2-cyclohexane dicarboxylate product, melting at 87–88° C.

Example 2.—Bis(p-chlorophenyl) 4-cyclohexene-1,2-dicarboxylate p-Chlorophenol (271 grams; 2.1 moles) was intimately mixed and blended with 152 grams (1 mole) of 4-cyclohexene-1,2-dicarboxylic acid anhydride and the resulting mixture heated at 100° C. for 2 hours. The mixture was then cooled to 75° C., and at this temperature 92 grams (0.6 mole) of phosphorus oxychloride ($POCl_3$) was added slowly, dropwise, and with continuous stirring. Upon completion of the addition of the phosphorous oxychloride, the resulting reaction mixture was heated at 85° for 4 hours and then at 100° C. for one hour to ensure completion of the reaction. Thereafter, the reaction mixture was poured into a container of finely crushed ice, whereby the mixture was immediately chilled, and was washed with water resulting from melting of the ice. The water was decanted and the remaining oily liquid organic residue washed several time further with water. Thereafter, the washed organic product phase was set aside for about one week, whereupon it spontaneously crystallized, and was subsequently recrystallized from tetrachloroethylene, to obtain a white solid crystalline bis(p-chlorophenyl) 4-cyclohexene-1,2-dicarboxylate product, melting from 66.3° to 67.5° C.

In similar manner other compounds of the present invention are prepared, such as:

Bis(p-bromophenyl) 4-cyclohexene-1,2-dicarboxylate, by reacting together about two molecular equivalents of p-bromophenol, one molecular equivalent of 4-cyclohexene-1,2-dicarboxylic acid anhydride, and about one-half molecular equivalent of phosphorus oxychloride.

Bis(p-bromophenyl) 1,2-cyclohexane dicarboxylate, by reacting together about 2 molecular equivalents of p-bromophenol, one molecular equivalent of 1,2-cyclohexane dicarboxylic acid anhydride, and about one-half molecular equivalent of phosphorus oxychloride.

The present compounds are useful as parasiticides and herbicides and are especially adapted to be employed as the active toxicants to kill submerged aquatic vegetation. For such use the unmodified compounds may be employed. In an alternative procedure, the compounds may be dispersed on an inert finely divided solid and the resulting preparations employed as dusts. Also, such preparations may be dispersed in water with or without the aid of a wetting agent, and the resulting aqueous suspensions employed as sprays. In other procedures the compounds may be employed in solvent, or as a constituent of solvent-in-water, or water-in-solvent emulsions, or as aqueous dispersions thereof which may be applied by spray, drench, or wash. In a representative operation a healthy stand of Lysimastrum nummularia, known in some localities as "moneywort," growing normally immersed in fresh water was immersed for an exposure period of 24 hours in water containing a dispersion of bis(p-chlorophenyl) 4-cyclohexene-1,2-dicarboxylate in the concentration of 100 parts of the said compound per million parts of water. At the end of the exposure period, the toxicant-bearing water was removed, the vegetation thoroughly rinsed, and thereafter restored to normal immersion in fresh water. The vegetation was examined three weeks later and wound to be almost completely killed as the result of the said treatment, whereas a similar growth of the same species of plant identically treated except that the compound of the present invention had been omitted, was growing normally and strongly.

We claim:

1. A bis-p-halophenyl ester of a 1,2-dicarboxylic acid corresponding to the formula

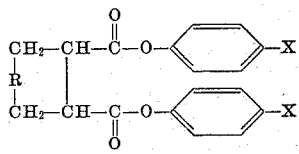

wherein R is selected from the group consisting of ethylene and vinylene and each X represents a halogen having an atomic weight between 30 and 85.

2. Bis(p-chlorophenyl) 4-cyclohexene-1,2-dicarboxylate.

3. Bis(p-chlorophenyl 1,2-cyclohexane dicarboxylate.

References Cited in the file of this patent

UNITED STATES PATENTS

| | | |
|---|---|---|
| 2,384,855 | Soday | Sept. 18, 1945 |
| 2,384,955 | Moyle | Sept. 18, 1945 |
| 2,628,249 | Bruno | Feb. 10, 1953 |